United States Patent [19]

Iino

[11] Patent Number: 5,771,225
[45] Date of Patent: Jun. 23, 1998

[54] SYSTEM FOR ADJUSTING CHARACTERISTIC OF PROTECTION UNIT WHEN SWITCHING FROM PLURAL WORKING UNITS HAVING VARIOUS CHARACTERISTICS TO PROTECTION UNIT

[75] Inventor: Hatsumi Iino, Kawasaki, Japan

[73] Assignee: Fujitsu Limited, Kanagawa, Japan

[21] Appl. No.: 589,196

[22] Filed: Jan. 22, 1996

Related U.S. Application Data

[63] Continuation of Ser. No. 215,327, Mar. 21, 1994, abandoned.

[30] Foreign Application Priority Data

Sep. 20, 1993 [JP] Japan .................................. 5-233104

[51] Int. Cl.$^6$ ........................................................ H04J 3/14
[52] U.S. Cl. ...................... 370/217; 370/244; 395/182.09
[58] Field of Search ...................................... 370/216, 217, 370/218, 242, 244, 252, 465; 340/825.01, 825.06, 825.16, 825.36; 379/258, 268, 279; 395/181, 182.01, 182.02, 182.08, 182.09, 182.11

[56] References Cited

U.S. PATENT DOCUMENTS

| | | |
|---|---|---|
| 4,245,342 | 1/1981 | Entenman ................................ 371/8.2 |
| 4,497,054 | 1/1985 | Read ........................................ 370/16 |
| 4,601,028 | 7/1986 | Huffman et al. ......................... 370/13 |
| 5,014,261 | 5/1991 | Shinabashi et al. ..................... 370/16 |
| 5,271,001 | 12/1993 | Hadano .................................... 370/16 |

FOREIGN PATENT DOCUMENTS

| | | |
|---|---|---|
| 0 208 270 | 1/1987 | European Pat. Off. . |
| 60-194839 | 10/1985 | Japan . |
| 4259123 | 9/1992 | Japan . |

*Primary Examiner*—Alpus H. Hsu
*Attorney, Agent, or Firm*—Helfgott & Karas, P.C.

[57] ABSTRACT

A system for processing a plurality of signals in parallel by a plurality of working-system processing units. A protection-system processing unit is provided as a substitute for one of the working-system processing units, and switch units are provided for switching the routes of the signals so that the signals are processed by the protection-system processing unit instead of the substituted working-system processing unit. The characteristic of the protection-system processing unit can be varied automatically under control of a characteristic control unit so that the characteristic of the protection-system processing unit becomes the same as the characteristic of the substituted working-system processing unit.

5 Claims, 10 Drawing Sheets

SYSTEM FOR ADJUSTING CHARACTERISTIC OF PROTECTION UNIT WHEN SWITCHING FROM PLURAL WORKING UNITS HAVING VARIOUS CHARACTERISTICS TO PROTECTION UNIT

This is a continuation of application Ser. No. 08/215,327, filed Mar. 21, 1994, now abandoned.

BACKGROUND OF THE INVENTION (1) Field of the Invention

The present invention relates to a system for adjusting a characteristic of a protection unit when switching from one of a plurality of working units having different characteristics to the protection unit, typically, an N-to-one protection switching system which activates a protection unit instead of one of N working units when said one of the N working units fails, where N is an integer more than one.

(2) Description of the Related Art

The system containing a plurality of working units and a protection unit as above, is usually used in terminal stations in transmission systems. In the terminal stations, conventionally, a plurality of pieces of terminal equipment are provided for receiving and transmitting transmission signals transmitted through a plurality of transmission lines, and at least one protection unit is provided for substituting for one of the plurality of working units which fails.

Although the above plurality of working units and the protection unit have substantially the same construction, the respective working units are usually preset in different ways. Therefore, when one of the plurality of working units is substituted by the protection unit, the protection unit must to be set in the same manner as the substituted working unit.

Conventionally, there is no technique for automatically setting the protection unit when the protection unit substitutes for one of the plurality of working units. Therefore, the setting of the protection unit must be performed manually, except in the case wherein all of the plurality of working units and the protection unit are set in the same manner.

SUMMARY OF THE INVENTION

An object of the present invention is to provide a system for automatically setting a characteristic of a protection unit when switching from one of a plurality of working units having different characteristics to the protection unit.

According to the first aspect of the present invention, there is provided a system for processing a plurality of signals in parallel. The system contains: a plurality of working-system processing units respectively provided corresponding to a plurality of input signals, for processing a signal input thereto and outputting the processed signal, where the plurality of working-system processing units further corresponding to a plurality of output signals, respectively; one or more protection-system processing units for processing a signal input thereto and outputting the processed signal; a first switch unit for receiving and supplying the plurality of input signals to the corresponding plurality of working-system processing units, respectively, in a first mode, and receiving and supplying at least one of the plurality of input signals to at least one of the above one or more protection-system processing units as at least one substitute for at least one of the plurality of working-system processing units, respectively, in a second mode; a second switch unit for receiving the processed signals output from the plurality of working-system processing units, and outputting the processed signals from the plurality of working-system processing units, as the corresponding plurality of output signals, respectively, in the first mode, and receiving at least one of the processed signals output from the above at least one of the above one or more protection-system processing units as the above at least one substitute for the above at least one of the plurality of working-system processing units, and outputting the processed signals from the above at least one of the above one or more protection-system processing units, as at least one of the plurality of output signals, respectively, in the second mode; a variable-characteristic unit provided in each of the above one or more protection-system processing units, for varying a characteristic of the above each of the above one or more protection-system processing units; and a characteristic control unit for controlling the variable-characteristic unit in the above at least one of the above one or more protection-system processing units so that the characteristic of the above at least one of the above one or more protection-system processing units becomes the same as the characteristic of the above at least one of the above plurality of working system processing units which is the above at least one substitute for the above at least one of the above one or more protection-system processing units in the second mode.

According to the second aspect of present invention, in addition to the construction of the first aspect of the present invention, the system further contains: a working characteristic storing unit for storing information on the characteristics of the plurality of working-system processing units; and the above characteristic control unit controls the variable-characteristic unit based on the information stored in the working characteristic storing unit.

According to the third aspect of present invention, in addition to the construction of the first aspect of the present invention, each of the plurality of working-system processing units contains a characteristic information holding unit for holding information indicating the characteristic of the above each of the plurality of working-system processing units. The above system according to the third aspect of the present invention further contains a working characteristic reading unit for reading information on the characteristic of each of the plurality of working-system processing units.

In the above constructions of the first to third aspects of the present invention, the system may further contain; a characteristic setting unit for holding control data therein and applying the control data to the variable-characteristic unit. In addition, the characteristic control unit may control the variable-characteristic unit by setting the control data in the characteristic setting unit.

In the above construction, the characteristic setting unit may contain a plurality of control data holding units, provided corresponding to the plurality of working-system processing units, each for holding and outputting the control data to be set in the characteristic setting unit in the corresponding one of the plurality of working-system processing units when the characteristic control unit controls the variable-characteristic unit; and a selector for selecting the control data for one of the plurality of working-system processing units, and applying the selected control data to the variable-characteristic unit.

DESCRIPTION OF THE PREFERRED EMBODIMENTS

Figure 1:
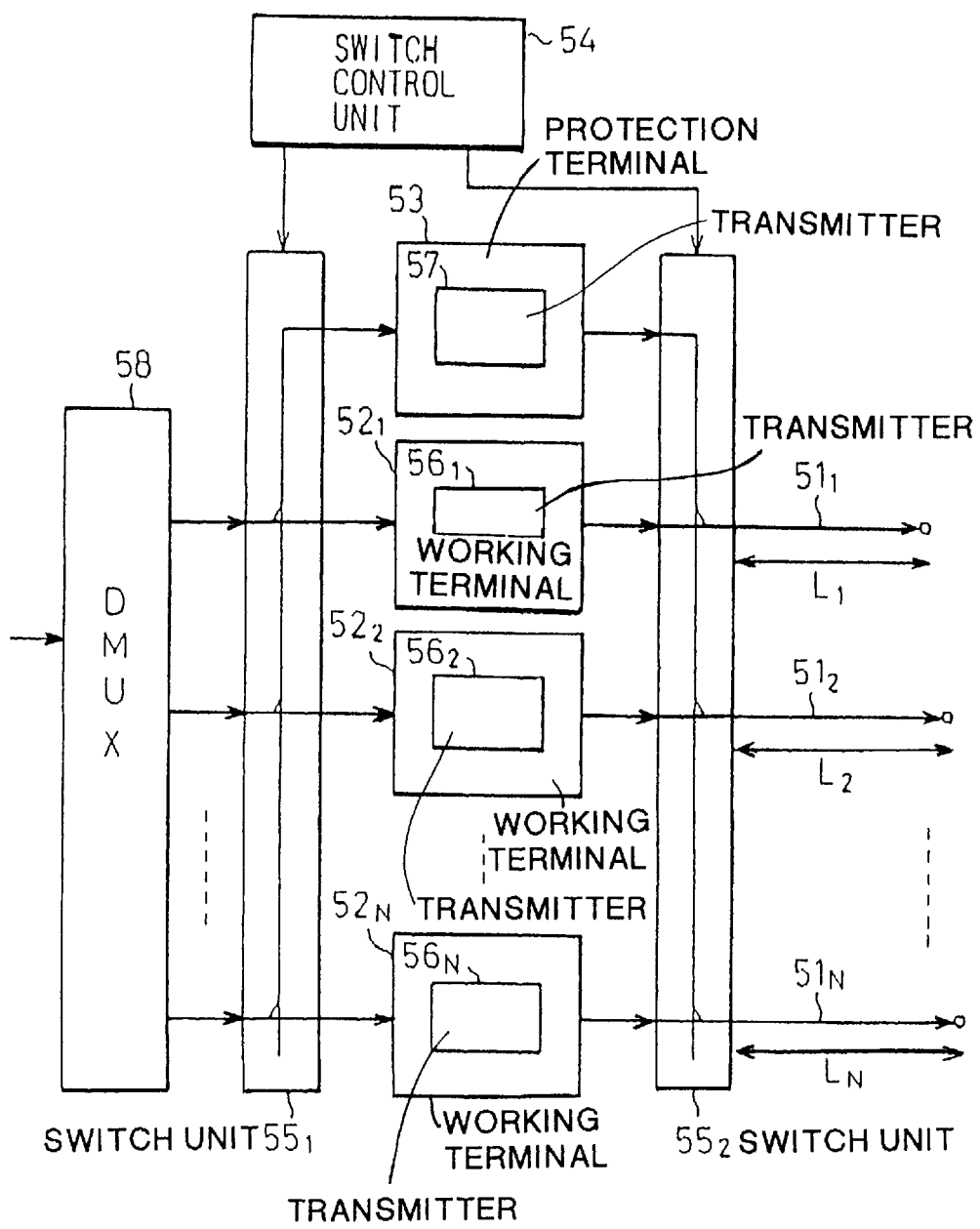
FIG. 1 is a diagram illustrating a portion of a construction of a conventional terminal station containing the N-to-one protection switch system.

Example of Conventional Construction (FIG. 1)

FIG. 1 is a diagram illustrating a portion of a construction of a portion of a conventional terminal station containing the N-to-one protection switch system, where N is an integer more than one. The terminal station contains a plurality (N) of pieces of working terminal equipment $52_1$ to $52_N$ respectively connected to a plurality of (tributary) transmission lines $51_1$ to $51_N$, a piece of protection terminal equipment 53, a switch control unit 54, a pair of protection switches $55_1$ and $55_2$ provided on both sides of the row of the N pieces of working terminal equipment $52_1$ to $52_N$ and the piece of protection terminal equipment 53, and a demultiplexer 58 which demultiplexes multiplexed transmission signals at a high transmission rate. The pieces of working terminal equipment $52_1$ to $52_N$ contain transmitter units $56_1$ to $56_N$, respectively, and the piece of protection terminal equipment 53 contains a transmitter unit 57.

The above multiplexed transmission signal such as an STS-N signal is demultiplexed by the demultiplexer 58 to a plurality of (N) tributary signals such as a DS1 signal, a DS1C signal, a DS2 signal, a DS3 signal, and an STS-1 signal. When all of the N pieces of working terminal equipment $52_1$ to $52_N$ operates normally, the protection switch $55_1$ connects the N outputs of the demultiplexer 58 to the N pieces of working terminal equipment $52_1$ to $52_N$, and the protection switch $55_2$ connects the N outputs of the N pieces of working terminal equipment $52_1$ to $52_N$ to the N tributary transmission lines $51_1$ to $51_N$.

Although not shown since it is well known, each of the N pieces of working terminal equipment $52_1$ to $52_N$ is provided with an alarm detecting unit which detects an abnormality in each piece of working terminal equipment, and informs the switch control unit 54 of the detection of the abnormality in each piece of working terminal equipment. Therefore, when trouble is detected in one of the N pieces of working terminal equipment $52_1$ to $52_N$, the switch control unit 54 controls the pair of protection switches $55_1$ and $55_2$ so that the protection switch $55_1$ connects one of the N outputs of the demultiplexer 58 corresponding to (i.e., which was connected to) the piece of working terminal equipment which failed, to the input of the piece of protection terminal equipment 53 instead of the piece of working terminal equipment which failed, and the output the piece of protection terminal equipment 53 to one of the N tributary transmission lines $51_1$ to $51_N$ corresponding to (i.e., which was connected to) the piece of working terminal equipment which failed. Further, when recovery from the failure is detected in the alarm detecting unit in the above piece of working terminal equipment, the recovery is informed to the switch control unit 54, and the switch control unit 54 controls the pair of protection switches $55_1$ and $55_2$ so that the above piece of working terminal equipment which failed and has recovered is connected to the corresponding output of the demultiplexer 58 and the corresponding one of the N tributary transmission lines $51_1$ to $51_N$.

Figure 2:
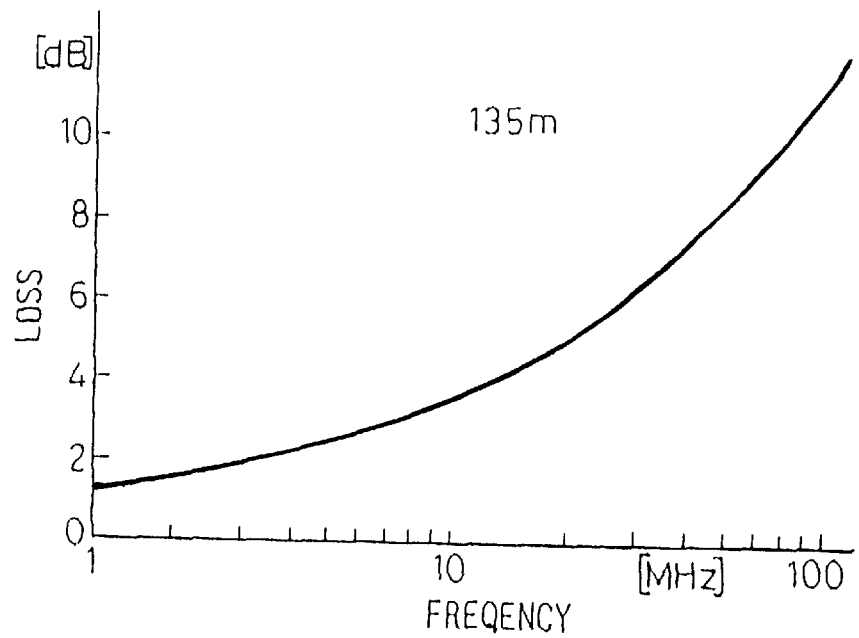
FIG. 2 is a diagram indicating a frequency characteristic of loss (in dB) in amplitudes of signals transmitted through a coaxial cable of a length equal to 135 meters in the frequency range of 1 to 100 MHz.
Figure 3:
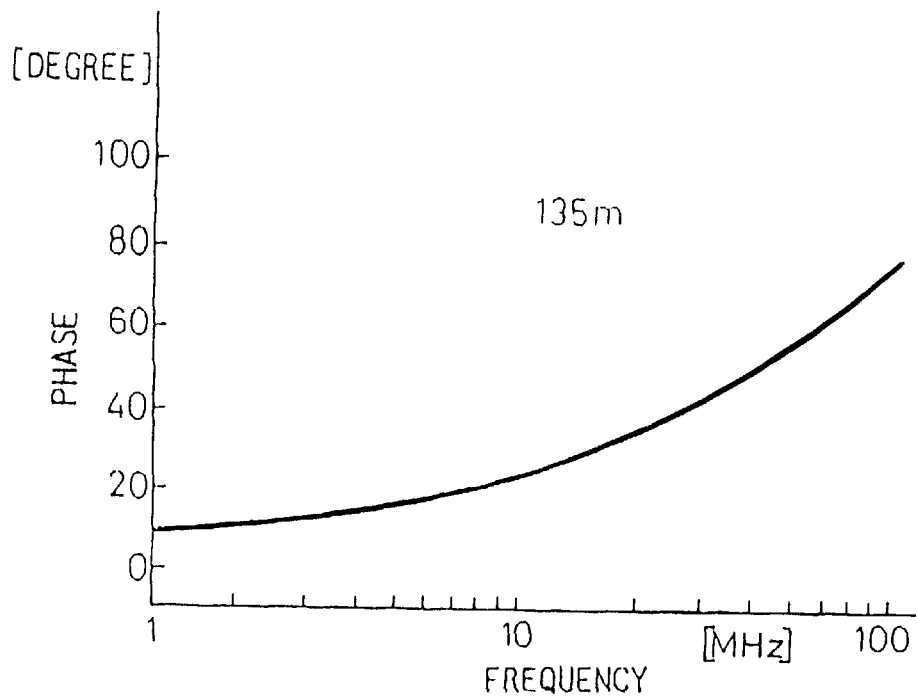
FIG. 3 is a diagram indicating a frequency characteristic of phase (in degrees) of signals transmitted through a coaxial cable of a length equal to 135 meters in the frequency range of 1 to 100 MHz.
Figure 4:
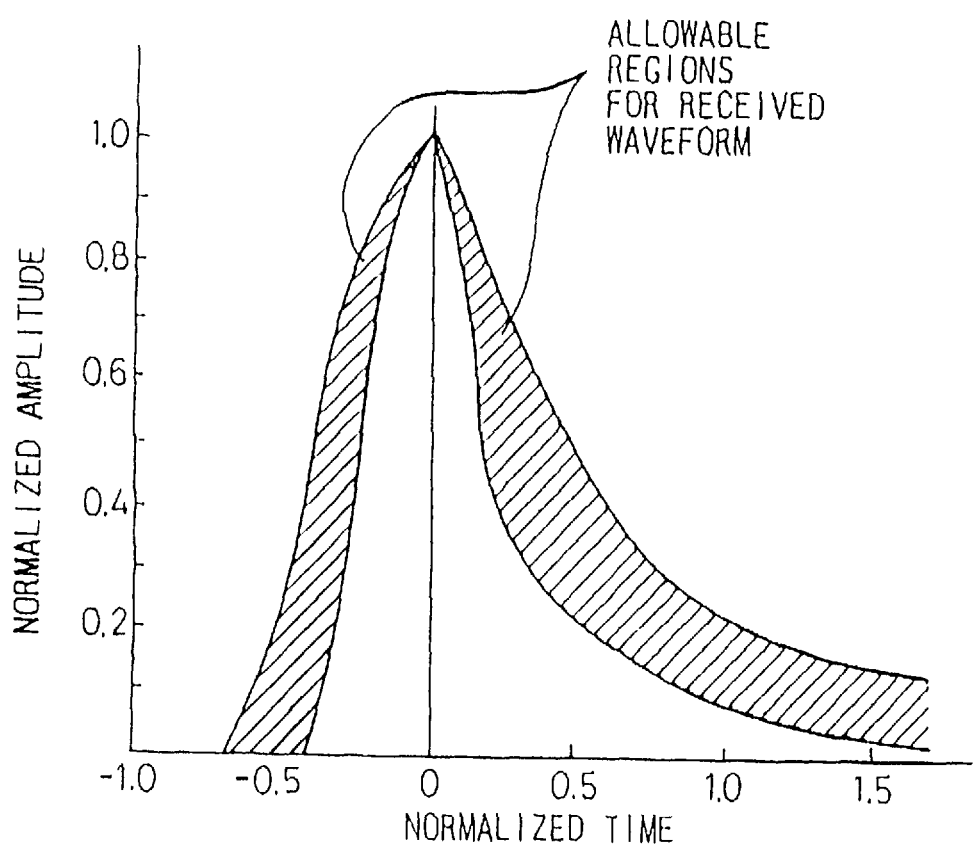
FIG. 4 is a diagram illustrating an example of a predetermined allowable range for waveforms when they are received.

Typical Problem in Conventional Construction (FIGS. 2, 3, and 4)

For example, when the above tributary signals are DS3 signals, the transmission lines $51_1$ to $51_N$ are coaxial cables. FIG. 2 is a diagram indicating a frequency characteristic of loss (in dB) in amplitudes of signals transmitted through a coaxial cable of a length equal to 135 meters in the frequency range of 1 to 100 MHz, and FIG. 3 is a diagram indicating a frequency characteristic of phase (in degree) of signals transmitted through a coaxial cable of a length equal to 135 meters in the frequency range of 1 to 100 MHz.

In addition, there is another requirement that the signals when they are received must have waveforms which are contained in a predetermined allowable areas, for example, as indicated in FIG. 4. In FIG. 4, the abscissa corresponds to a normalized time, the ordinates corresponds to a normalized amplitude, and the above predetermined allowable areas are indicated by hatching. Therefore, the transmitter units $56_1$ to $56_N$ in the N pieces of working terminal equipment $52_1$ to $52_N$ and the transmitter unit 57 in the piece of protection terminal equipment 53, must be designed and preset so that the waveforms of the tributary signals transmitted therefrom through the respective transmission lines $51_1$ to $51_N$ are within the above predetermined allowable range of FIG. 4 when they are received.

When the lengths of the tributary transmission lines $51_1$ to $51_N$ are the same, the transmitter units $56_1$ to $56_N$ in the N pieces of working terminal equipment $52_1$ to $52_N$ can be designed and preset in the same manner, and therefore, the transmitter unit 57 in the piece of protection terminal equipment 53 can be also designed and preset in the same manner as the respective pieces of working terminal equipment $52_1$ to $52_N$. However generally, it is difficult to make the lengths of the tributary transmission lines $51_1$ to $51_N$ the same due to the other design requirement. In this case, the respective transmitter units $56_1$ to $56_N$ in the N pieces of working terminal equipment $52_1$ to $52_N$ are required to be designed or preset in different ways, and thus, the transmitter unit 57 in the piece of protection terminal equipment 53 is required to be set when it is substituteds for one of the N pieces of working terminal equipment $52_1$ to $52_N$, so that the transmitter unit 57 in the piece of protection terminal equipment 53 has the same output characteristic as the substituted piece of working terminal equipment.

Figure 5:
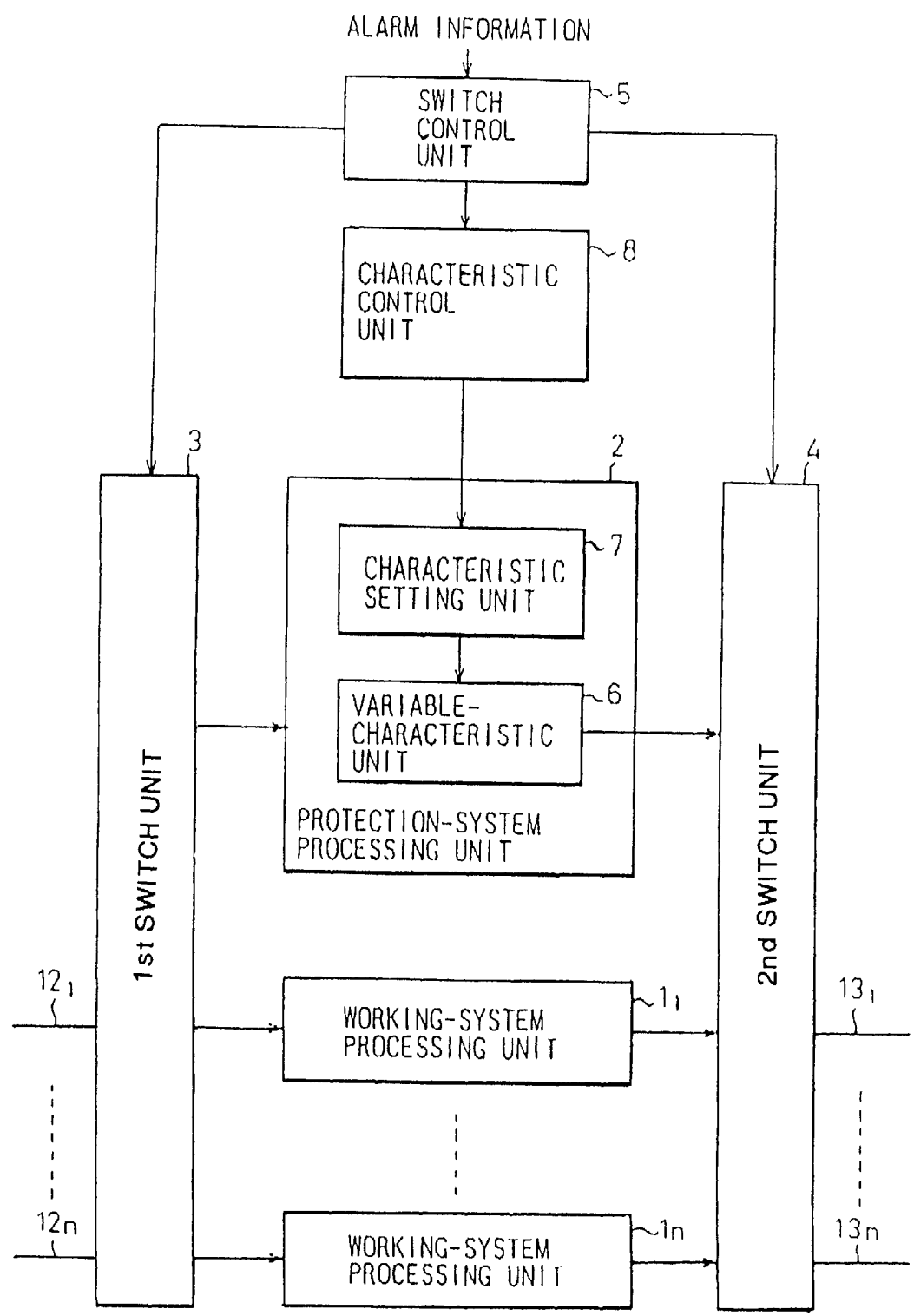
FIG. 5 is a diagram illustrating a basic construction of the first aspect of the present invention.

Basic Construction of First Aspect of Present Invention (FIG. 5)

FIG. 5 is a diagram illustrating a basic construction of the first aspect of the present invention. In FIG. 5, reference numeral $1_1$ to $1_n$ each denote a working-system processing unit, 2 denotes a protection-system processing unit, 3 denotes a first switch unit, 4 denotes a second switch unit, 5 denotes a switch control unit, 6 denotes a variable-characteristic unit, 7 denotes a characteristic setting unit, 8 denotes a characteristic control unit, $12_1$ to $12_n$ denote a plurality of first transmission lines respectively, and $13_1$ to $13_n$ denote a plurality of second transmission lines, respectively, where n is an integer more than one.

The plurality of working-system processing units $1_1$ to $1_n$ are provided corresponding to the plurality of first transmission lines $12_1$ to $12_n$, respectively, and the plurality of second transmission lines $13_1$ to $13_n$ are provided corresponding to the plurality of working-system processing units $1_1$ to $1_n$. The plurality of working-system processing units $1_1$ to $1_n$ each can receive an input signal from the corresponding one of the plurality of first transmission lines $12_{1\ to\ 12n}$, and can process the input signal in accordance with a characteristic of each working-system processing unit, to output the processed signal to the corresponding one of the plurality of second transmission lines $13_1$ to $13_n$. The protection-system processing unit 2, as a substitute for one of the plurality of working-system processing units $1_1$ to $1_n$, can receive an input signal from one of the plurality of first transmission lines $12_1$ to $12_n$ which corresponds to the substituted one of the plurality of working-system processing units $1_1$ to $1_n$, and can process the input signal in accordance with a characteristic of the protection-system processing unit 2, to output the processed signal to one of the plurality of second transmission lines $13_1$ to $13_n$ which corresponds to the above substituted one of the plurality of working-system processing units $1_1$ to $1_n$. The pair of switch units 3 and 4 are provided on rows on the input and output sides of the plurality of working-system processing units $1_1$ to $1_n$ and the protection-system processing unit 2, respectively. In a first mode, the first switch unit 3 connects the inputs of the plurality of working-system processing units $1_1$ to $1_n$ with the corresponding first transmission lines $12_1$ to $12_n$, respectively, and the second switch unit 4 connects the outputs of the plurality of working-system processing units $1_1$ to $1_n$ with the corresponding second transmission lines $13_1$ to $13_n$, respectively. In a second mode the first switch unit 3 connects the inputs of the plurality of working-system processing units $1_1$ to $1_n$ except one of the plurality of working-system processing units $1_1$ to $1_n$, with the corresponding first transmission lines $12_1$ to $12_n$, respectively, except one of the plurality of first transmission lines $12_1$ to $12_n$ corresponding to the above excepted one of the plurality of working-system processing units $1_1$ to $1_n$; and connects the input of the protection-system processing unit 2 with the above excepted one of the plurality of first transmission lines $12_1$ to $12_n$. In the second mode, the second switch unit 4 connects the outputs of the plurality of working-system processing units $1_1$ to $1_n$ except one of the plurality of working-system processing units $1_1$ to $1_n$, with the corresponding second transmission lines $13_1$ to $13_n$, respectively, except one of the plurality of second transmission lines $13_1$ to $13_n$ corresponding to the above excepted one of the plurality of working-system processing units $1_1$ to $1_n$; and connects the output of the protection-system processing unit 2 with the above excepted one of the plurality of second transmission lines $13_1$ to $13_n$. The mode of the connections in the first and second switch units 3 and 4, and selection of one of the plurality of working-system processing units $1_1$ to $1_n$ as the above excepted one, are controlled by the switch control unit 5. When all of the plurality of working-system processing units $1_1$ to $1_n$ operate normally, the pair of switch units 3 and 4 operate in the above first mode. When an alarm event occurs in one of the plurality of working-system processing units $1_1$ to $1_n$, the operations of the switch units 3 and 4 are changed to the second mode.

When the switch control unit 5 receives alarm information indicating an occurrence of an alarm event in one of the plurality of working-system processing units $1_1$ to $1_n$, the switch control unit 5 controls the switch units 3 and 4 so that the protection-system processing unit 2, as the substitute for the above one of the plurality of working-system processing units $1_1$ to $1_n$ in which the alarm event has occurred, receives an input signal from one of the plurality of first transmission lines $12_1$ to $12_n$ which corresponds to the substituted one of the plurality of working-system processing units $1_1$ to $1_n$, and processes the input signal in accordance with a characteristic of the protection-system processing unit 2, to output the processed signal to one of the plurality of second transmission lines $13_1$ to $13_n$ which corresponds to the above substituted one of the plurality of working-system processing units $1_1$ to $1_n$.

The protection-system processing unit 2 contains the variable-characteristic unit 6 which can vary the characteristic of the protection-system processing unit 2 under control of the characteristic control unit 8. The protection-system processing unit may further contain the characteristic setting unit 7. When the protection-system processing unit contains the characteristic setting unit 7, the characteristic control unit 8 can set control data in controlling the characteristic setting unit 7, where the control data indicates a requested characteristic of the protection-system processing unit 2. When the protection-system processing unit 2 is substituted for one of the plurality of working-system processing units $1_1$ to $1_n$, the characteristic control unit 8 controls the variable-characteristic unit 6 or sets the control data, so that the characteristic of the protection-system processing unit 2 becomes equivalent to the characteristic of the above substituted one of the plurality of working-system processing units $1_1$ to $1_n$. The characteristic control unit 8 is activated when one of the plurality of working-system processing units $1_1$ to $1_n$ is substituted by the protection-system processing unit 2 under the control of the switch control unit 5. The characteristic control unit 8 may be activated by the switch control unit 5.

According to the construction of the first aspect of the present invention, the protection-system processing unit 2 contains the variable-characteristic unit 6, and the characteristic of the protection-system processing unit 2 can be controlled by the characteristic control unit 8, (preferably, by setting the control data in the characteristic setting unit in the protection-system processing unit 2 by the characteristic control unit 8). Thus, the characteristic of the protection-system processing unit 2 can be automatically set when one of the plurality of working-system processing units $1_1$ to $1_n$ is substituted by the protection-system processing unit 2 so that the characteristic of the protection-system processing unit 2 becomes equivalent to the characteristic of the above substituted one of the plurality of working-system processing units $1_1$ to $1_n$.

Alternatively, the above operation of the switch control unit 5 may be replaced by a manual operation. Namely, the first and second switch units 3 and 4 may be constructed so that the connections in the first and second switch units 3 and 4 can be manually changed. In this case, although not shown, the system further contains a switch status detecting unit for detecting the status concerning the connections in the first and second switch units 3 and 4, and indicating the status, and the characteristic control unit 8 can have a status indication detecting unit for detecting the indication of the status. When the characteristic control unit 8 detects that one of the plurality of working-system processing units $1_1$ to $1_n$ is substituted by the protection-system processing unit 2, the characteristic control unit 8 operates in the same way as in the case when the characteristic control unit 8 receives the alarm information.

Figure 6:
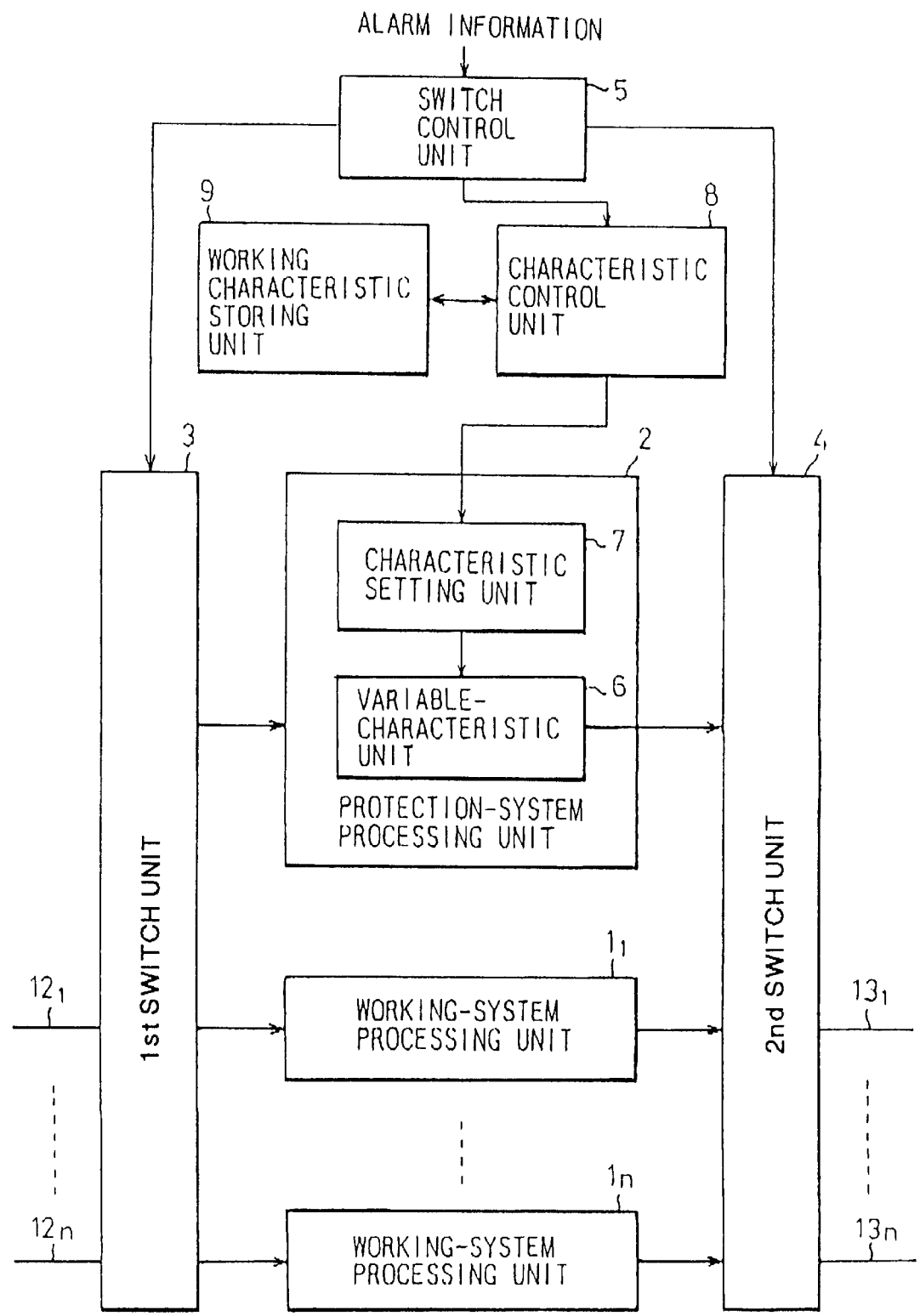
FIG. 6 is a diagram illustrating a basic construction of the second aspect of the present invention.

Basic Construction of Second Aspect of Present Invention (FIG. 6)

FIG. 6 is a diagram illustrating a basic construction of the second aspect of the present invention. In FIG. 6, the same elements as FIG. 5 are denoted by the same reference numerals. In addition to the construction of FIG. 5, the construction of FIG. 6 has a working characteristic storing unit 9.

In the construction of the second aspect of the present invention, the working characteristic storing unit 9 stores the characteristics of the respective working-system processing units $1_1$ to $1_n$, for example, in the form of the above control data. Therefore, the characteristic control unit 8 can refer to the working characteristic storing unit 9 when characteristic control unit 8 controls the variable-characteristic unit 6 in the protection-system processing unit 2, or when the characteristic control unit 8 sets the control data in the characteristic setting unit 7.

Figure 7:
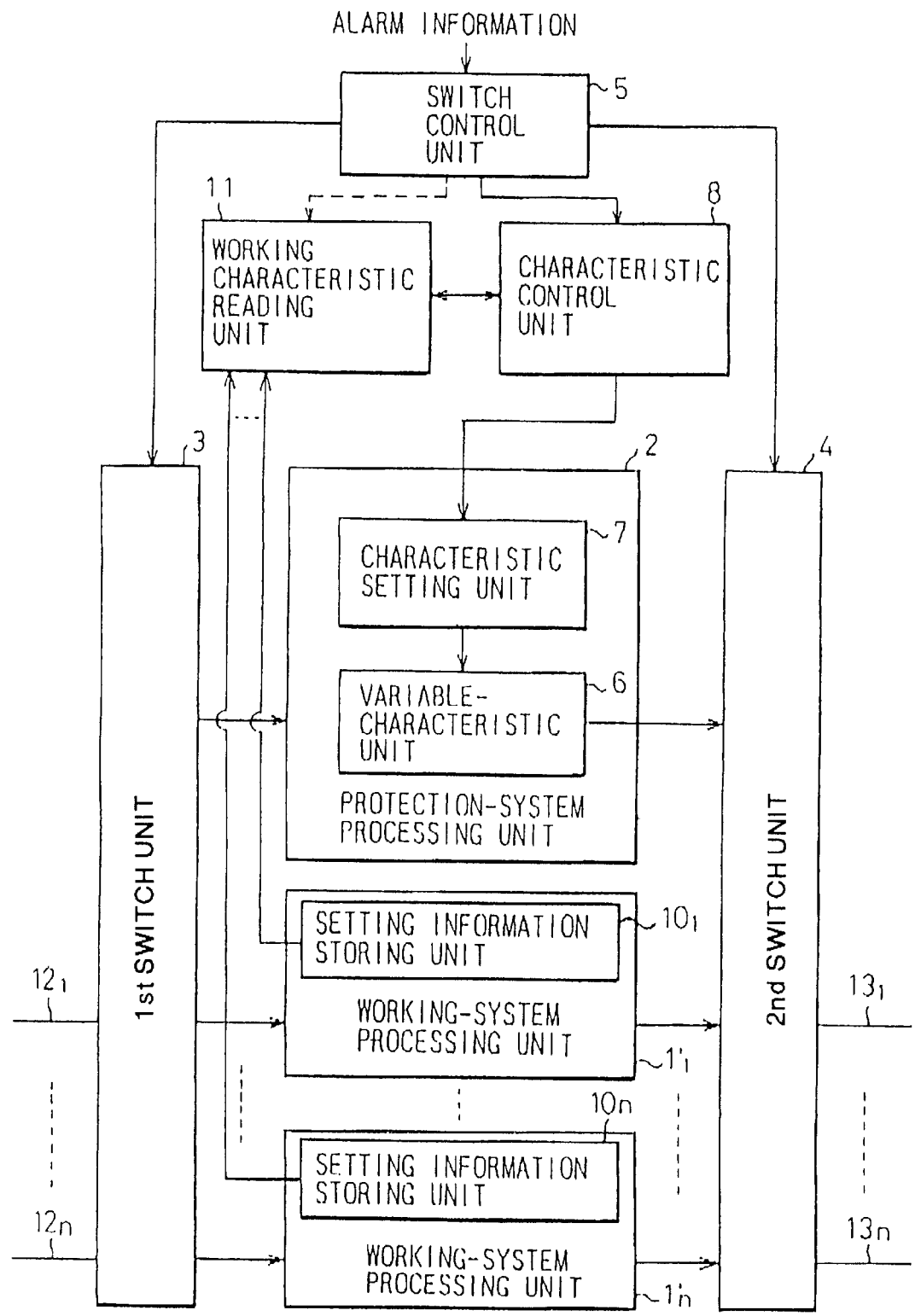
FIG. 7 is a diagram illustrating a basic construction of the third aspect of the present invention.

Basic Construction of Third Aspect of Present Invention (FIG. 7)

FIG. 7 is a diagram illustrating a basic construction of the third aspect of the present invention. In FIG. 7, the same elements as FIG. 5 are denoted by the same reference numerals except that the working-system processing units are denoted by reference numerals $1_1'$ to $1_n'$. In addition to the construction of FIG. 5, the construction of FIG. 7 has a working characteristic reading unit 11, and the respective working-system processing units $1_1'$ to $1_n'$ contain characteristic setting units $10_1$ to $10_n$, respectively.

In the construction of the third aspect of the present invention, the characteristic setting units $10_1$ to $10_n$ in the working-system processing units $1_1'$ to $1_n'$ hold control data which control the characteristics of the working-system processing units $1_1'$ to $1_n'$, respectively. The constructions of the working-system processing units $1_1'$ to $1_n'$ may be the same as the construction of the protection-system processing unit 2. The working characteristic reading unit 11 can read the content of the control data set in the characteristic setting unit in one of the plurality of working-system processing units $1_1'$ to $1_n'$, when that one of the plurality of working-system processing units $1_1$ to $1_n$ is to be substituted by the protection-system processing unit 2. The control data read by the working characteristic reading unit 11 is supplied to the characteristic control unit 8, and is then set in the characteristic setting unit 7 in the protection-system processing unit 2 by the characteristic control unit 8. The above operation of the working characteristic reading unit 11 may be activated by the characteristic control unit 8 or the switch control unit 5. Thus, the characteristic control unit 8 can obtain the control data to be set in the characteristic setting unit 7 in the protection-system processing unit 2.

Although the above explanations are made for the cases wherein only one protection-system processing unit is provided, it will be easily understood that, when more than one protection-system processing unit are provided in the constructions of FIGS. 5 to 7, apparently, the above operations for setting characteristics in the respective protection-system processing units can be performed in the same manner as above.

Figure 8:
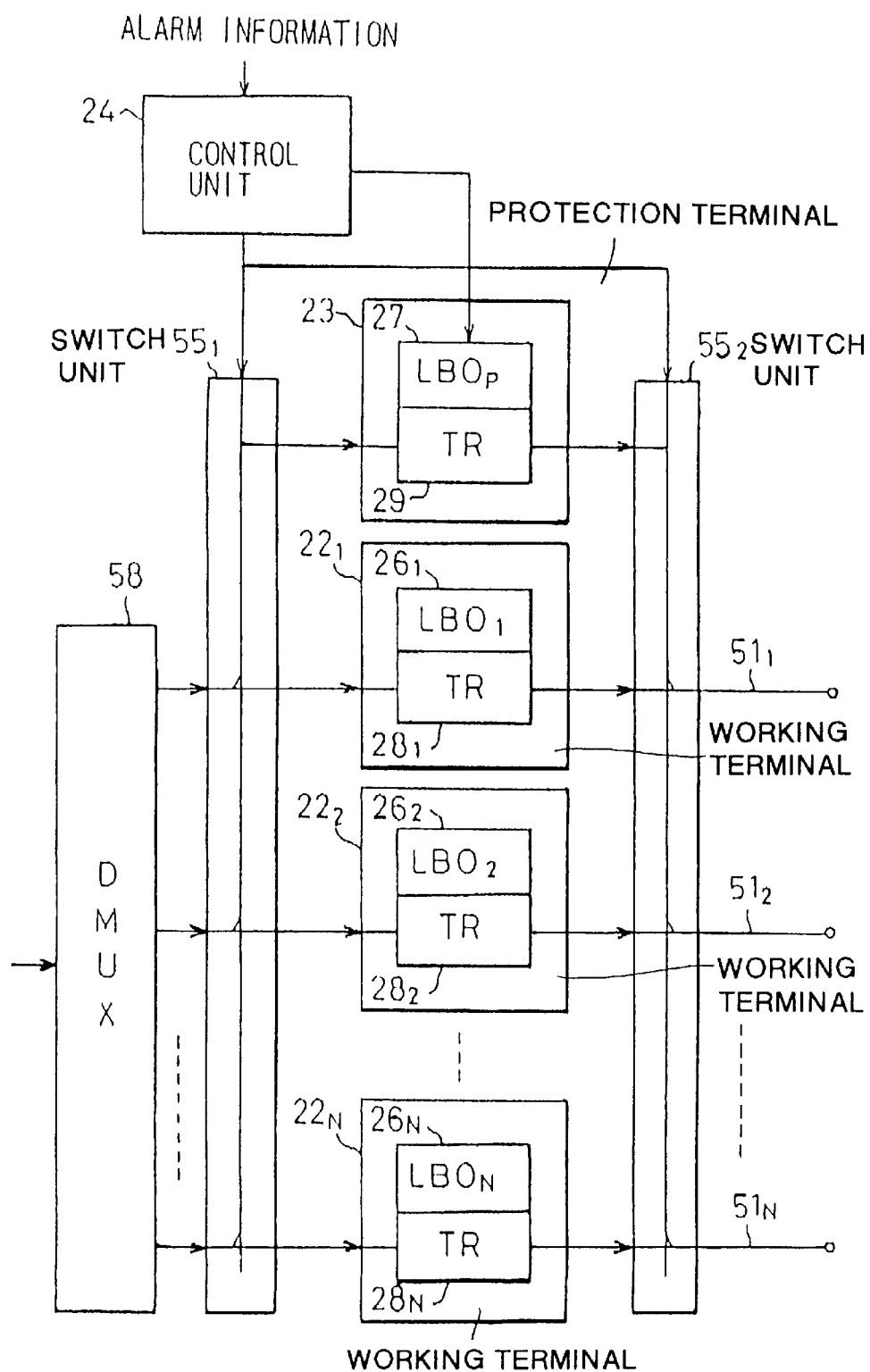
FIG. 8 is a diagram illustrating a construction of the first embodiment of the present invention.

Construction of First Embodiment (FIG. 8)

FIG. 8 is a diagram illustrating a construction of the first embodiment of the present invention. The construction of FIG. 8 corresponds to the same portion of a terminal station as FIG. 1. In FIG. 8, the same elements as FIG. 1 are denoted by the same reference numerals. In FIG. 8, reference numeral $22_1$ to $22_N$ each denote a piece of working terminal equipment, 23 denotes a piece of protection terminal equipment, 24 denotes a control unit, $26_1$ to $26_N$ each denote a characteristic setting unit in each piece of working terminal equipment, $28_1$ to $28_N$ each denote a transmitter unit in each piece of working terminal equipment, 27 denotes a characteristic setting unit in the piece of protection terminal equipment, and 29 denotes a protection-system transmitter unit in the piece of protection terminal equipment.

The construction of FIG. 8 corresponds to the basic construction of FIG. 5. The control unit 24 realizes the functions of the switch control unit 5 and the characteristic control unit 8 in FIG. 5, and the pair of switch units $55_1$ and $55_2$ correspond to the pair of switch units 3 and 4 in FIG. 5, respectively. The pieces of working terminal equipment $22_1$ to $22_N$ in FIG. 8 correspond to the working-system processing units $1_1$ to $1_n$ in FIG. 5, respectively, and the piece of protection terminal equipment 23 in FIG. 8 corresponds to the protection-system processing unit 2 in FIG. 5. The characteristic setting unit 27 in the piece of protection terminal equipment 23 in FIG. 8 corresponds to the characteristic setting unit 7 in the protection-system processing unit 2 in FIG. 5, and the transmitter unit 29 in the piece of protection terminal equipment 23 in FIG. 8 corresponds to the variable-characteristic unit 6 in the protection-system processing unit 2 in FIG. 5.

In the embodiment of FIG. 8, the transmitter units $28_1$ to $28_N$ in the pieces of working terminal equipment $22_1$ to $22_N$ have the same construction as the transmitter unit 29 in the piece of protection terminal equipment 23, and the pieces of working terminal equipment $22_1$ to $22_N$ further contain the characteristic setting units $26_1$ to $26_N$, respectively. Each of the characteristic setting units $26_1$ to $26_N$ and 27 in the pieces of working terminal equipment $22_1$ to $22_N$ and the piece of protection terminal equipment 23 contains a register (as explained later with reference to FIG. 11) for holding control data ($LBO_1$ to $LEO_N$) for controlling the output characteristic of the corresponding transmitter unit. In the embodiment of FIG. 8, the output characteristics of the transmitter units $28_1$ to $28_N$ and 29 in the pieces of working terminal equipment $22_1$ to $22_N$ and the piece of protection terminal equipment 23 are adjusted corresponding to the lengths of the tributary transmission lines $51_1$ to $51_N$ (LINE BUILT OUT), and therefore the control data are denoted by $LBO_1$ to $LBO_N$, respectively. Each of the transmitter units $28_1$ to $28_N$ and 29 in the pieces of working terminal equipment $22_1$ to $22_N$ and the piece of protection terminal equipment 23 has a construction such that the output characteristic thereof can be varied in accordance with the control data held in the above register in the corresponding characteristic setting unit. An example of such a construction of transmitter unit will be explained later with reference to FIG. 11.

In advance of the operation of the terminal station of FIG. 8, the control data $LBO_1$ to $LBO_N$ may be preset in the above registers in the characteristic setting units $26_1$ to $26_N$ by a manual switch (not shown) or by the control unit 24.

Similar to the construction of FIG. 5, when the control unit 24 receives alarm information indicating an occurrence of an alarm event in one of the plurality of pieces of working terminal equipment $22_1$ to $22_N$, the control unit 24 controls the switch units $55_1$ and $55_2$ so that the piece of protection terminal equipment 23, as a substitute for the above one of the plurality of pieces of working terminal equipment $22_1$ to $22_N$ in which the alarm event has occurred, receives an input signal from one of the plurality of outputs of the demultiplexer 58 which corresponds to the substituted one of the plurality of pieces of working terminal equipment $22_1$ to $22_N$, and processes the input signal in accordance with a characteristic of the piece of protection terminal equipment 23, to output the processed signal to one of the plurality of tributary transmission lines $51_1$ to $51_n$ which corresponds to the above substituted one of the plurality of pieces of working terminal equipment $22_1$ to $22_N$.

The control unit 24 can set control data for use in controlling the transmitter unit 29 in the piece of protection terminal equipment 23, where the control data indicates a requested output characteristic of the transmitter unit 29 in the piece of protection terminal equipment 23. When the piece of protection terminal equipment 23 is substituted for one of the plurality of pieces of working terminal equipment $22_1$ to $22_N$, the control unit 24 sets the control data in the above-mentioned register in the characteristic setting unit 27 in the piece of protection terminal equipment 23, so that the output characteristic of the transmitter unit 29 in the piece of protection terminal equipment 23 becomes equivalent to the output characteristic of the above substituted one of the plurality of pieces of working terminal equipment $22_1$ to $22_N$. Namely, the control unit 24 sets in the register in the characteristic setting unit 27 in the piece of protection terminal equipment 23, the same control data as that held in the register in the characteristic setting unit in the substituted one of the plurality of pieces of working terminal equipment $22_1$ to $22_N$. Thus, the transmitter unit 29 in the piece of protection terminal equipment 23 has the same output characteristic as the transmitter unit in the substituted one of the plurality of pieces of working terminal equipment $22_1$ to $22_N$.

Figure 9:
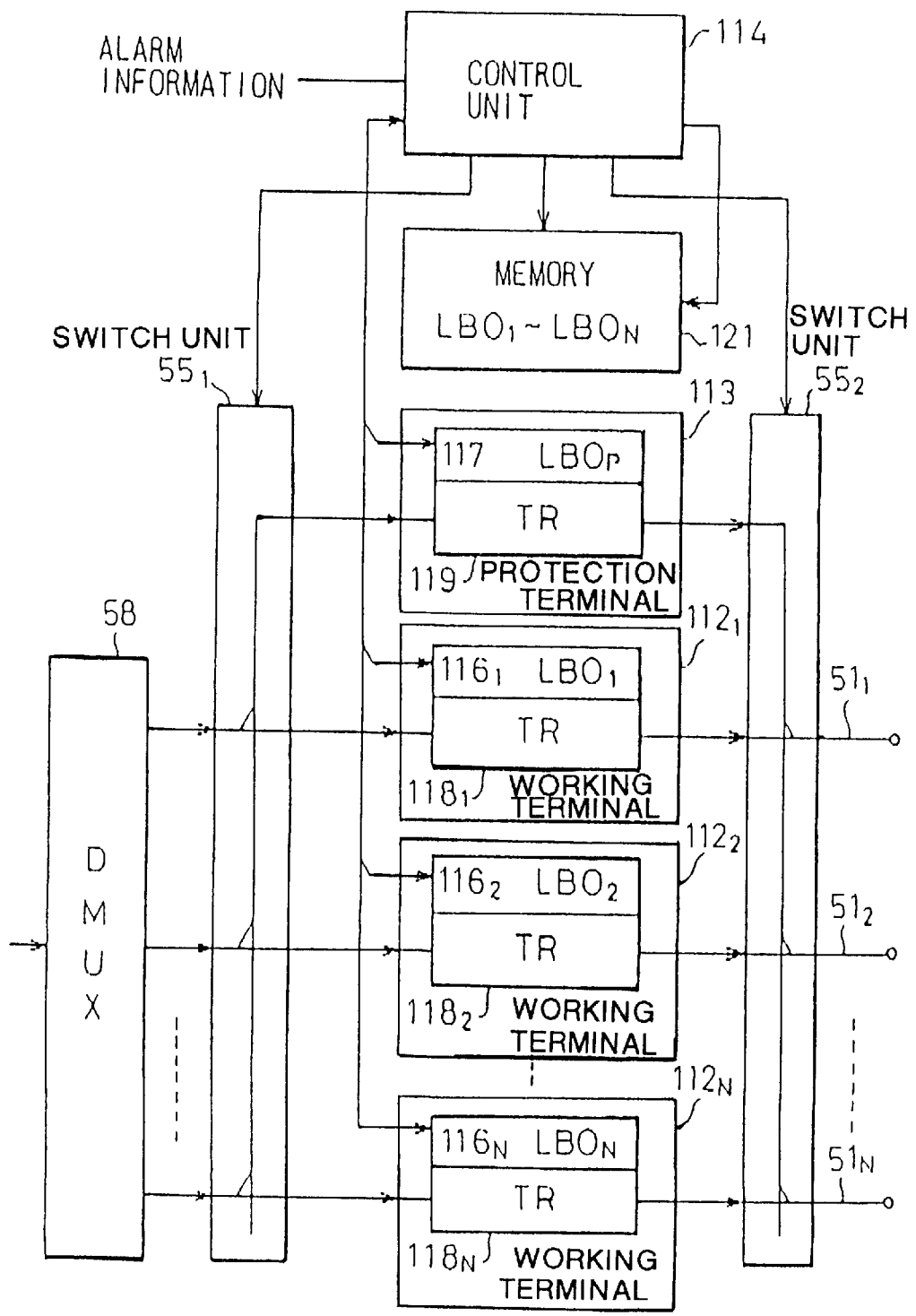
FIG. 9 is a diagram illustrating a construction of the second embodiment of the present invention.

Construction of Second Embodiment (FIG. 9)

FIG. 9 is a diagram illustrating a construction of the second embodiment of the present invention. The construction of FIG. 9 corresponds to the same portion of a terminal station as FIG. 8. In FIG. 9, the same elements as FIG. 8 are denoted by the same reference numerals. In FIG. 9, reference numeral $112_1$ to $112_N$ each denote a piece of working terminal equipment, 113 denotes a piece of protection terminal equipment, 114 denotes a control unit, $116_1$ to $116_N$ each denote a characteristic setting unit in each piece of working terminal equipment, $118_1$ to $118_N$ each denote a transmitter unit in each piece of working terminal equipment, 117 denotes a characteristic setting unit in the piece of protection terminal equipment, and 119 denotes a protection-system transmitter unit in the piece of protection terminal equipment. The construction of FIG. 9 further contains a memory 121 for storing control data ($LBO_1$ to $LBO_N$).

The construction of FIG. 9 corresponds to the basic constructions of FIGS. 6 and 7. The control unit 114 realizes the functions of the switch control unit 5 and the characteristic control unit 8 in FIGS. 6 and 7, and the working characteristic reading unit 11 in FIG. 7, and the pair of switch units $55_1$ and $55_2$ correspond to the pair of switch units 3 and 4 in FIGS. 6 and 7, respectively. The pieces of working terminal equipment $112_1$ to $112_N$ in FIG. 9 correspond to the working-system processing units $1_1'$ to $1_n'$ in FIG. 7, respectively, and the piece of protection terminal equipment 113 in FIG. 9 corresponds to the protection-system processing unit 2 in FIGS. 6 and 7. The characteristic setting unit 117 in the piece of protection terminal equipment 113 in FIG. 9 corresponds to the characteristic setting unit 7 in the protection-system processing unit 2 in FIGS. 6 and 7, and the transmitter unit 119 in the piece of protection terminal equipment 113 in FIG. 9 corresponds to the variable-characteristic unit 6 in the protection-system processing unit 2 in FIGS. 6 and 7. Further, the characteristic setting units $116_1$ to $116_N$ in FIG. 9 correspond to the characteristic setting units $10_1$ to $10_n$ in FIG. 7, respectively, and the memory 121 in FIG. 9 corresponds to the working characteristic storing unit 9 in FIG. 7.

In advance of the operation of the terminal station of FIG. 9, the control data $LBO_1$ to $LBO_N$ may be preset in the above registers in the characteristic setting units $116_1$ to $116_N$ by a manual switch (not shown) or by the control unit 114.

The construction of each of the pieces of working terminal equipment $112_1$ to $112_N$ and the piece of protection terminal equipment 117 in FIG. 9 is the same as explained for the construction of FIG. 8, and the operations of controlling the switch units $55_1$ and $55_2$, and setting of the control data in the characteristic setting unit 117 in the piece of protection terminal equipment 113, are performed in the same manner as the construction of FIG. 8.

In addition, in the construction of FIG. 9, the memory 121 stores the control data which are the same as those held in the registers in the characteristic setting units $116_1$ to $116_N$ in the pieces of working terminal equipment $112_1$ to $112_N$, and the control unit 114 can obtain the control data to be set in the characteristic setting unit 117 in the piece of protection terminal equipment 113, by referring to the memory 121.

Further, in the construction of FIG. 9, the control unit 124 can access the register in each of the characteristic setting units $116_1$ to $116_N$ in the pieces of working terminal equipment $112_1$ to $112_N$, to read the content thereof. Therefore, the control unit 14 can obtain the above control data without referring to the memory 121. In addition, before starting the operation of the terminal station, the control unit 14 can obtain the control data held in the registers in the characteristic setting units $116_1$ to $116_N$ in the respective pieces of working terminal equipment $112_1$ to $112_N$ by accessing to them as above, and write the control data in the memory 121 for use in setting the control data in the characteristic setting unit 117 in the piece of protection terminal equipment 113 in operation.

Figure 10:
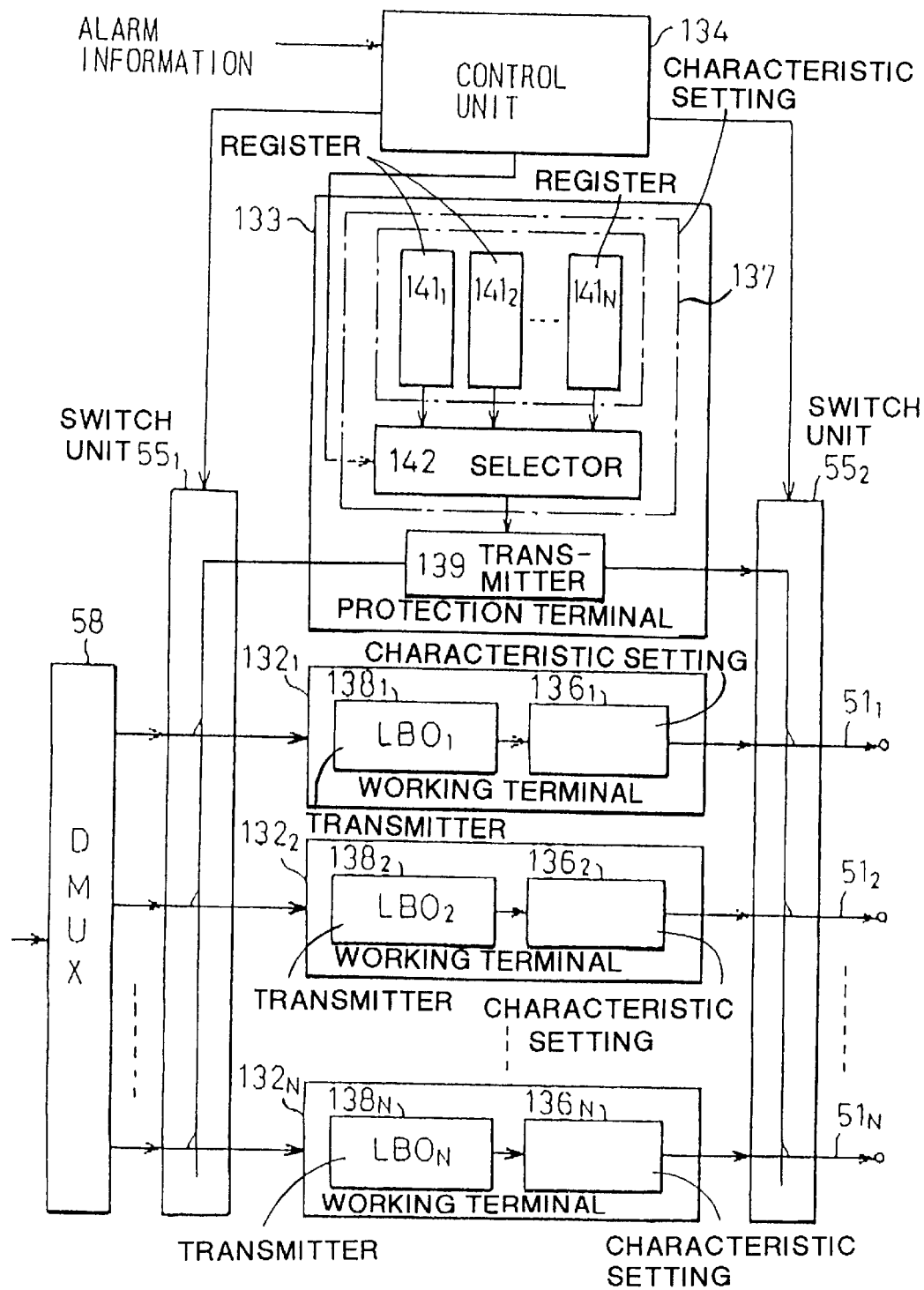
FIG. 10 is a diagram illustrating a construction of the third embodiment of the present invention.

Construction of Third Embodiment (Fig. 10)

FIG. 10 is a diagram illustrating a construction of the third embodiment of the present invention. The construction of FIG. 10 corresponds to the same portion of a terminal station as FIGS. 8 and 9. In FIG. 10, the same elements as FIG. 1 are denoted by the same reference numerals. In FIG. 10, reference numeral $132_1$ to $132_N$ each denote a piece of working terminal equipment, 133 denotes a piece of protection terminal equipment, 134 denotes a control unit, $136_1$ to $136_N$ each denote a characteristic setting unit in each piece of working terminal equipment, $138_1$ to $138_N$ each denote a transmitter unit in each piece of working terminal equipment, 137 denotes a characteristic setting unit in the piece of protection terminal equipment 133, and 139 denotes a protection-system transmitter unit in the piece of protection terminal equipment 133. In the construction FIG. 10, the characteristic setting unit 137 in the piece of protection terminal equipment 133 contains a plurality of working characteristic storing registers $141_1$ to $141_N$ and a characteristic selector 142. The plurality of working characteristic storing registers $141_1$ to $141_N$ are provided corresponding to the pieces of working terminal equipment $132_1$ to $132_N$, respectively. Each of the plurality of working characteristic storing registers $141_1$ to $141_N$ stores control data which realizes in the transmitter unit 139 in the piece of protection terminal equipment 133 the output characteristic of the transmitter unit in one of the pieces of working terminal equipment $132_1$ to $132_N$ corresponding to the working characteristic storing register. Namely, each of the plurality of working characteristic storing registers $141_1$ to $141_N$ stores the same control data which is set in the characteristic setting unit in one of the pieces of working terminal equipment $132_1$ to $132_N$ corresponding to the working characteristic storing register, when the transmitter units $138_1$ to $138_N$ and 139 in the pieces of working terminal equipment $132_1$ to $132_N$ and the piece of protection terminal equipment 133 have the same construction wherein the output characteristic thereof can be varied in accordance with the control data supplied from the corresponding characteristic setting unit. When one of the plurality of pieces of working terminal equipment $132_1$ to $132_N$ is substituted by the piece of protection terminal equipment 133, the characteristic selector 142 selects and applies to the transmitter unit 139 in the piece of protection terminal equipment 133, one of the outputs of the plurality of working characteristic storing registers $141_1$ to $141_N$ corresponding to the substituted one of the plurality of pieces of working terminal equipment $132_1$ to $132_N$, where the control unit 134 controls the characteristic selector 142. Thus, control data realizing a requested characteristic in the transmitter unit 139 in the piece of protection terminal equipment 133 can be supplied to the transmitter unit 139.

In advance of the operation of the terminal station of FIG. 9, the control data $LBO_1$ to $LBO_N$ may be preset in the above registers in the characteristic setting units $116_1$ to $116_N$ by a manual switch (not shown) or by the control unit 114.

The constructions of FIG. 10 and the operations thereof, other than those described above, are the same as those explained for the construction of FIGS. 8 and 9.

In the above constructions of FIGS. 8, 9, and 10, the operations of the control units 24, 114, and 134 may be performed by software or hardware logic circuitry.

Figure 11:
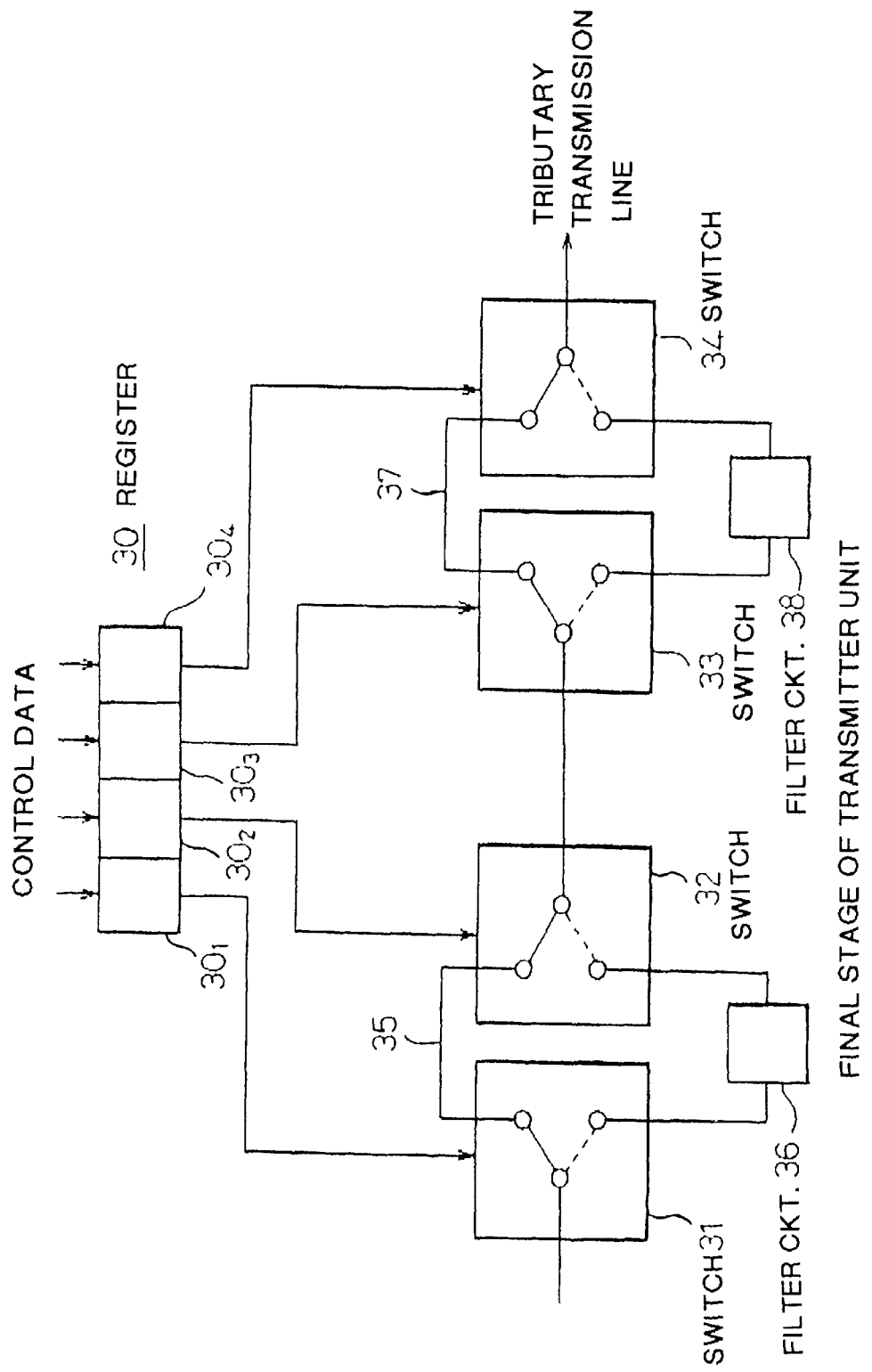
FIG. 11 is a construction of an example of the variable-characteristic portion of each transmitter unit in the pieces of working and protection terminal equipment in the embodiments of FIGS. 8, 9, and 10.

Construction of Variable-Characteristic Unit (FIG. 11)

FIG. 11 is a construction of an example of the variable-characteristic portion of each transmitter unit in the pieces of working and protection terminal equipment in the embodiments of FIGS. 8, 9, and 10. The construction of the variable-characteristic portion indicated in FIG. 11 is provided in the final stage of each transmitter unit in the pieces of working and in the piece of protection terminal equipment. In FIG. 11, reference numeral 30 denotes a control data register which realizes the characteristic setting unit, 31, 32, 33, and 34 each denote an analog switch, 35 and 37 each denote a short-circuit path, 36 and 38 each denote a filter circuit.

The filter circuit 36 gives an amplitude loss and a phase shift which are equivalent to those a transmission line of a length equal to 100 feet gives, to transmission signals which pass through the filter circuit 36; and the filter circuit 38 gives an amplitude loss and a phase shift which are equivalent to those a transmission line of a length equal to 225 feet gives, to transmission signals which pass through the filter circuit 38.

The control data register 30 contains four bits $30_1$, $30_2$, $30_3$, and $30_4$. The four bits $30_1$, $30_2$, $30_3$, and $30_4$ controls the analog switches 31, 32, 33, and 34, respectively. When four bits $30_1$, $30_2$, $30_3$, and $30_4$ are (0, 0, 0, 0), transmission signals from the previous stage of the transmitter unit pass through the short-circuit paths 35 and 37, and are then output onto the tributary transmission line. Therefore, the transmission signals which are passed through the construction of FIG. 11 suffer an amplitude loss and a phase shift which are equivalent to those a transmission signal which is passed through a transmission line of a length equal to 100 feet suffers. When four bits $30_1$, $30_2$, $30_3$, and $30_4$ are (1, 1, 0, 0), the transmission signals from the previous stage of the transmitter unit pass through the filter circuit 36 and the short-circuit path 37, and are then output onto the tributary transmission line. Therefore, the transmission signals which are passed through the construction of FIG. 11 suffer an amplitude loss and a phase shift which are equivalent to those a transmission signal which is passed through a transmission line of a length equal to 100 feet suffers. When four bits $30_1$, $30_2$, $30_3$, and $30_4$ are (0, 0, 1, 1), the transmission signals from the previous stage of the transmitter unit pass through the short-circuit path 35 and the filter circuit 38, and are then output onto the tributary transmission line. Therefore, the transmission signals which are passed through the construction of FIG. 11 suffer an amplitude loss and a phase shift which are equivalent to those a transmission signal which is passed through a transmission line of a length equal to 225 feet suffers. When four bits $30_1$, $30_2$, $30_3$, and $30_4$ are (1, 1, 1, 1), the transmission signals from the previous stage of the transmitter unit pass through the filter circuits 36 and 38, and are then output onto the tributary transmission line. Therefore, the transmission signals which are passed through the construction of FIG. 11 suffer an amplitude loss and a phase shift which are equivalent to those a transmission signal which is passed through a transmission line of a length equal to 325 feet suffers.

Other Matters

As explained with reference to FIG. 5, the first and second switch units $55_1$ and $55_2$ may be constructed so that the connections in the first and second switch units $55_1$ and $55_2$ can be manually changed. In this case, the above operations for setting the control data by the control units in the respective embodiments, may be triggerred by the detection of the change. Namely, when the control unit in each embodiment detects a change by which one of the plurality of pieces of working terminal equipment is substituted by the piece of protection terminal equipment, the control unit operates in the same way as in the case when the control unit receives the alarm information.

I claim:

1. A system for processing a plurality of signals in parallel, comprising:

a plurality of working-system processing units respectively provided corresponding to a plurality of input signals, each processing unit for processing a respective signal input thereto and for outputting a processed signal, the plurality of working-system processing units corresponding to a plurality of output signals, respectively;

at least one protection-system processing unit for processing a signal input thereto and outputting the processed signal;

first switch means for receiving and supplying the plurality of input signals to the corresponding plurality of working-system processing units, respectively, in a first mode, and receiving and supplying at least one of the plurality of input signals to said at least one protection-system processing unit as at least one substitute for at least one of the plurality of working-system processing units, respectively, in a second mode;

second switch means for receiving the processed signals output from the plurality of working-system processing units, and outputting the processed signals from the plurality of working-system processing units, as the corresponding plurality of output signals, respectively, in the first mode, and receiving the processed signal output from said at least said protection-system processing unit as said at least one substitute for said at least one of the plurality of working-system processing units, and outputting the processed signals from said at least one protection-system processing unit, as at least one of the plurality of output signals, respectively, in the second mode;

variable-characteristic means provided in said at least one protection-system processing unit, for varying a frequency characteristic corresponding to amplitude loss and phase shift of said at least one protection-system processing unit; and characteristic control means for controlling the variable-characteristic means in said at least one protection-system processing unit so that the frequency characteristic of said at least one protection-system processing unit becomes the same as the frequency characteristic of said at least one of said plurality of working-system processing units for which said at least one protection-system processing unit substitutes in the second mode.

2. A system according to claim 1, further comprising a working characteristic storing means for storing information on the characteristics of the plurality of working-system processing units, and said characteristic control means controls the variable-characteristic means based on the information stored in the working characteristic storing means.

3. A system according to claim 1, wherein each of the plurality of working-system processing units comprises a characteristic information holding means for holding information indicating the frequency characteristic of each of the plurality of working-system processing units;

said system further comprising a working characteristic reading means for reading information on the frequency characteristic of each of the plurality of working-system processing units.

4. A system according to claim 1, further comprising a characteristic setting means for holding control data therein and applying the control data to the variable-characteristic means, and said characteristic control means controls the variable-characteristic means by setting the control data in the characteristic setting means.

5. A system according to claim 4, wherein said characteristic setting means comprises, a plurality of control data holding means, corresponding to the plurality of working-system processing units, each control data holding means for holding and outputting the control data to be set in the characteristic setting means in the corresponding one of the plurality of working-system processing units when the characteristic control means controls the variable-characteristic means, and a selector for selecting the control data for one of the plurality of working-system processing units, and applying the selected control data to the variable-characteristic means.

* * * * *